(12) United States Patent
Hart et al.

(10) Patent No.: US 8,814,744 B2
(45) Date of Patent: Aug. 26, 2014

(54) ELECTROMECHANICAL CLUTCH AND TRANSMISSION

(75) Inventors: James M. Hart, Belleville, MI (US);
Daryl A. Wilton, Macomb, MI (US);
Edward W. Mellet, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 179 days.

(21) Appl. No.: 13/475,570

(22) Filed: May 18, 2012

(65) Prior Publication Data
US 2013/0310212 A1 Nov. 21, 2013

(51) Int. Cl.
*F16H 3/62* (2006.01)

(52) U.S. Cl.
USPC .............................. 475/276; 475/278; 475/279

(58) Field of Classification Search
USPC ............... 475/276, 278, 279; 192/84.1, 84.31
See application file for complete search history.

(56) References Cited

U.S. PATENT DOCUMENTS

| | | | |
|---|---|---|---|
| 3,263,784 A * | 8/1966 | Pierce | 192/84.31 |
| 3,678,783 A * | 7/1972 | O'Malley et al. | 475/276 |
| 6,176,803 B1 | 1/2001 | Meyer et al. | |
| 6,342,026 B1 | 1/2002 | Takagi et al. | |
| 6,547,688 B2 | 4/2003 | Takagi et al. | |
| 6,558,287 B2 | 5/2003 | Hayabuchi et al. | |
| 6,634,980 B1 | 10/2003 | Ziemer | |
| 6,663,528 B1 | 12/2003 | Haka | |
| 6,736,751 B1 | 5/2004 | Usoro et al. | |
| 6,743,139 B1 | 6/2004 | Usoro et al. | |
| 6,743,140 B1 | 6/2004 | Lee et al. | |
| 6,743,142 B1 | 6/2004 | Lee et al. | |
| 6,743,143 B1 | 6/2004 | Usoro et al. | |
| 6,743,144 B1 | 6/2004 | Lee et al. | |
| 6,746,357 B1 | 6/2004 | Usoro et al. | |
| 6,752,736 B1 | 6/2004 | Lee et al. | |
| 6,755,765 B2 | 6/2004 | Usoro et al. | |
| 6,758,784 B2 | 7/2004 | Lee et al. | |
| 6,758,787 B2 | 7/2004 | Usoro et al. | |
| 6,764,424 B1 | 7/2004 | Usoro et al. | |
| 6,764,425 B2 | 7/2004 | Lee et al. | |
| 6,764,426 B2 | 7/2004 | Usoro et al. | |
| 6,767,307 B1 | 7/2004 | Lee et al. | |
| 6,802,795 B2 | 10/2004 | Miyazaki et al. | |
| 6,811,512 B2 | 11/2004 | Usoro et al. | |
| 6,837,823 B2 | 1/2005 | Lee et al. | |
| 6,852,059 B2 | 2/2005 | Lee et al. | |
| 6,960,149 B2 | 11/2005 | Ziemer | |
| 6,984,187 B2 | 1/2006 | Biermann | |
| 6,991,578 B2 | 1/2006 | Ziemer | |

(Continued)

OTHER PUBLICATIONS

Pending U.S. Appl. No. 13/206,862, filed Aug. 10, 2011, by Mellet et al. All pages.

(Continued)

*Primary Examiner* — Edwin A Young

(57) ABSTRACT

A transmission is provided having an input member, an output member, at least four planetary gear sets, a plurality of coupling members and a plurality of torque transmitting mechanisms. Each of the planetary gear sets includes first, second and third members. The torque transmitting mechanisms include clutches and brakes actuatable in combinations of two to establish a plurality of forward gear ratios and one reverse gear ratio. An electromechanical rotating clutch assembly is provided that includes a rotor, an armature, and an electromagnetic coil. The electromagnetic coil is operable to selectively engage the rotor with the armature.

20 Claims, 2 Drawing Sheets

(56) References Cited

U.S. PATENT DOCUMENTS

| | | |
|---|---|---|
| 7,011,597 B2 | 3/2006 | Haka |
| 7,014,589 B2 | 3/2006 | Stevenson |
| 7,018,319 B2 | 3/2006 | Ziemer |
| 7,101,305 B2 | 9/2006 | Tabata et al. |
| 7,128,683 B2 | 10/2006 | Oguri et al. |
| 7,163,484 B2 | 1/2007 | Klemen |
| 2005/0090362 A1 | 4/2005 | Abe et al. |
| 2006/0019791 A1 | 1/2006 | Baldwin |
| 2006/0213743 A1* | 9/2006 | Wolf .......................... 192/48.2 |
| 2006/0270513 A1 | 11/2006 | Klemen |
| 2006/0270514 A1 | 11/2006 | Oguri et al. |
| 2006/0270516 A1 | 11/2006 | Klemen |

OTHER PUBLICATIONS

Pending U.S. Appl. No. 13/428,825, filed Mar. 23, 2012, by Mellet et al. All pages.

\* cited by examiner

| GEAR STATE | GEAR RATIO | RATIO STEP | TORQUE TRANSMITTING ELEMENTS ||||||| 
|---|---|---|---|---|---|---|---|---|---|
| | | | 134 | 132 | 136 | 138 | 128 | 126 | 130 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.902 | 1.11 | X | | | X | | | |
| 8TH | 0.746 | 1.21 | | X | | | X | | |
| 9TH | 0.632 | 1.18 | | | | X | X | | |
| 10TH | 0.583 | 1.08 | | X | | X | | | |
| 11TH | 0.526 | 1.11 | | | | X | | X | |
| 12TH | 0.475 | 1.11 | | | | X | | | X |

X = ON - ENGAGED CARRYING TORQUE
O = ON - ENGAGED NOT CARRYING TORQUE

ELECTROMECHANICAL CLUTCH AND TRANSMISSION

FIELD

The invention relates generally to a clutch and a multiple speed transmission, and more particularly, to an electromechanical clutch for use in a transmission having a plurality of speeds, planetary gear sets, and torque transmitting mechanisms.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios. In addition, clutches typically suffer spin losses, thus compromising fuel economy.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission with better fuel economy.

SUMMARY

A transmission is provided having an input member, an output member, at least three planetary gear sets, a plurality of coupling members and a plurality of torque transmitting mechanisms. Each of the planetary gear sets includes first, second and third members. The torque transmitting mechanisms may be, for example, clutches and brakes. One of the torque transmitting mechanisms includes an electromechanical clutch having an electromagnetic coil.

In one variation, which may be combined with or separate from the other variations described herein, an electromechanical rotating clutch assembly for use in an automatic transmission is provided. The automatic transmission includes first and second transmission members, each configured to rotate during at least one output gear speed of the automatic transmission. The electromechanical assembly is selectively engageable to interconnect the first transmission member with the second transmission member. The electromechanical assembly includes a rotor coupled to the first transmission member, an armature coupled to the second transmission member, and an electromagnetic coil. The electromagnetic coil is operable to selectively engage the rotor with the armature.

In another variation, which may be combined with or separate from the other variations described herein, a transmission is provided that includes an input member, an output member, first, second, third, and fourth planetary gear sets each having first, second, and third members, at least five interconnecting members, and at least seven torque transmitting mechanisms.

A first interconnecting member continuously interconnects the third member of the first planetary gear set with the third member of the fourth planetary gear set. A second interconnecting member continuously interconnects the second member of the first planetary gear set with the third member of the third planetary gear set. A third interconnecting member continuously interconnects the first member of the first planetary gear set with the second member of the second planetary gear set. A fourth interconnecting member continuously interconnects the third member of the second planetary gear set with the second member of the third planetary gear set. A fifth interconnecting member continuously interconnects the first member of the second planetary gear set with the second member of the fourth planetary gear set.

The seven torque transmitting mechanisms are each selectively engageable to interconnect at least one of the first, second, and third members with at least one other of the first, second, third members and a stationary member. The seven torque transmitting mechanisms are selectively engageable in combinations of at least two to establish a plurality of forward speed ratios and at least one reverse speed ratio between the input member and the output member. A first torque transmitting mechanism has a rotor, an armature, and an electromagnetic coil. The electromagnetic coil is operable to selectively engage the rotor with the armature.

In yet another variation, which may be combined with or separate from the other variations described herein, a transmission is provided that includes a stationary member and four planetary gear sets, each having a sun gear member, a planetary gear carrier member, and a ring gear member. The transmission of this variation further includes an input member continuously connected for common rotation with the second sun gear member and the fourth planetary gear carrier member. It also includes an output member continuously connected for common rotation with the first planetary gear carrier member and the third ring gear member. In addition, the transmission has at least three other interconnecting members. A first interconnecting member continuously interconnects the first sun gear member with the fourth sun gear member. A second interconnecting member continuously interconnects the first ring gear member with the second planetary gear carrier member. A third interconnecting member continuously interconnects the second ring gear member with the third planetary gear carrier member.

Furthermore, the transmission in this example includes a number of torque transmitting mechanisms. A first clutch is selectively engageable to interconnect the third sun gear member with the input member, the second sun gear member, and the fourth planetary gear carrier member. A second clutch is selectively engageable to interconnect the third planetary gear carrier member and the second ring gear member with the input member, the second sun gear member, and the fourth planetary gear carrier member. A third clutch is selectively engageable to interconnect the third planetary gear carrier member and the second ring gear member with the third sun gear member. A first brake is selectively engageable to interconnect the third sun gear member with the stationary member. A second brake is selectively engageable to interconnect the third planetary gear carrier member and the second ring gear member with the stationary member. A third brake is selectively engageable to interconnect the first sun gear member and the fourth sun gear member with the stationary member. A fourth brake is selectively engageable to interconnect the fourth ring gear member with the stationary member.

The first, second, and third clutches and the first, second, third, and fourth brakes are selectively engageable in combinations of at least two to establish at least twelve forward speed ratios and at least one reverse speed ratio between the input member and the output member. In this variation, the third clutch includes a rotor, an armature, and an electromagnetic coil operable to selectively engage the rotor with the armature. The rotor has a rotor surface, and the armature has an armature surface. The electromagnetic coil is operable to selectively interconnect the armature surface with the rotor surface. The armature surface and the rotor surface are in contact with each other when interconnected.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In some forms of the present disclosure, an eleven or twelve speed transmission is provided in a relatively small package by achieving eleven or twelve forward speeds with four planetary gear sets, four brakes, and three clutches, at least one of which includes an electromechanical clutch having an electromagnetic coil. In other variations, however, additional brakes, clutches, planetary gear sets, or other components may be added.

At the outset, it should be appreciated that the embodiments of the eleven or twelve speed automatic transmissions of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a first component or element of a first planetary gear set is permanently coupled to a second component or element of a second planetary gear set. A second component or element of the first planetary gear set is permanently coupled to a third component or element of a third planetary gear set. A third component or element of the first planetary gear set is permanently coupled to a third component or element of a fourth planetary gear set. A third component or element of the second planetary gear set is permanently coupled to a second component or element of the third planetary gear set. A first component or element of the second planetary gear set is permanently coupled to a second component or element of the fourth planetary gear set.

Figure 1:
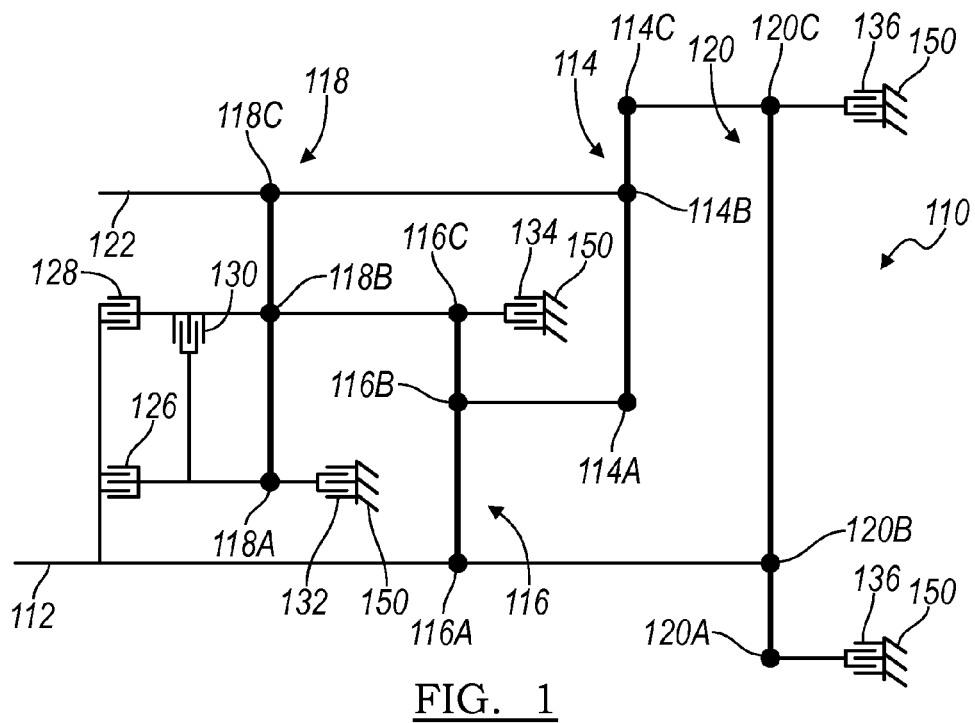
FIG. 1 is a lever diagram of an embodiment of a transmission according to the principles of present invention.

Referring now to FIG. 1, an embodiment of a twelve speed transmission 110 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting mechanisms such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 110 includes an input shaft or member 112, a first planetary gear set 114, a second planetary gear set 116, a third planetary gear set 118, a fourth planetary gear set 120, and an output shaft or member 122. In the lever diagram of FIG. 1, the first planetary gear set 114 has three nodes: a first node 114A, a second node 114B, and a third node 114C. The second planetary gear set 116 has three nodes: a first node 116A, a second node 116B, and a third node 116C. The third planetary gear set 118 has three nodes: a first node 118A, a second node 118B, and a third node 118C. The fourth planetary gear set 120 has three nodes: a first node 120A, a second node 120B, and a third node 120C.

The input member 112 is continuously coupled to the first node 116A of the second planetary gear set 116 and the second node 120B of the fourth planetary gear set 120. The output member 122 is continuously coupled to the third node 118C of the third planetary gear set 118 and the second node 114B of the first planetary gear set 114.

The first node 114A of the first planetary gear set 114 is coupled to the second node 116B of the second planetary gear set 116. The second node 114B of the first planetary gear set 114 is coupled to the third node 118C of the third planetary gear set 118. The third node 114C of the first planetary gear set 114 is coupled to the third node 120C of the fourth planetary gear set 120.

The first node 116A of the second planetary gear set 116 is coupled to the second node 120B of the fourth planetary gear set 120. The third node 116C of the second planetary gear set 116 is coupled to second node 118B of the third planetary gear set 118.

A first clutch 126 selectively connects the input member or shaft 112, the first node 116A of the second planetary gear set 116, and the second node 120B of the fourth planetary gear set 120 with the first node 118A of the third planetary gear set 118. A second clutch 128 selectively connects the input member or shaft 112, the first node 116A of the second planetary gear set 116, and the second node 120B of the fourth planetary gear set 120 with the second node 118B of the third planetary gear set 118 and the third node 116C of the second planetary gear set 116. A third clutch 130 selectively connects the first node 118A of the third planetary gear set 118 with the third node 116C of the second planetary gear set 116 and the second node 118B of the third planetary gear set 118. In the alternative, the third clutch 130 could selectively connect the third node 118C of the third planetary gear set 118 with the second node 118B of the third planetary gear set 118. In another alternative, the third clutch 130 could selectively connect the third node 118C of the third planetary gear set 118 with the first node 118A of the third planetary gear set 118.

A first brake 132 selectively connects the first node 118A of the third planetary gear set 118 with a stationary member or transmission housing 150. A second brake 134 selectively connects the third node 116C of the second planetary gear set 116 and the second node 118B of the third planetary gear set 118 with the stationary member or transmission housing 150. A third brake 136 selectively connects the third node 114C of the first planetary gear set 114 and the third node 120C of the fourth planetary gear set 120 with the stationary member or transmission housing 150. A fourth brake 138 selectively connects the first node 120A of the fourth planetary gear set 120 with the stationary member or transmission housing 150.

Figure 2:
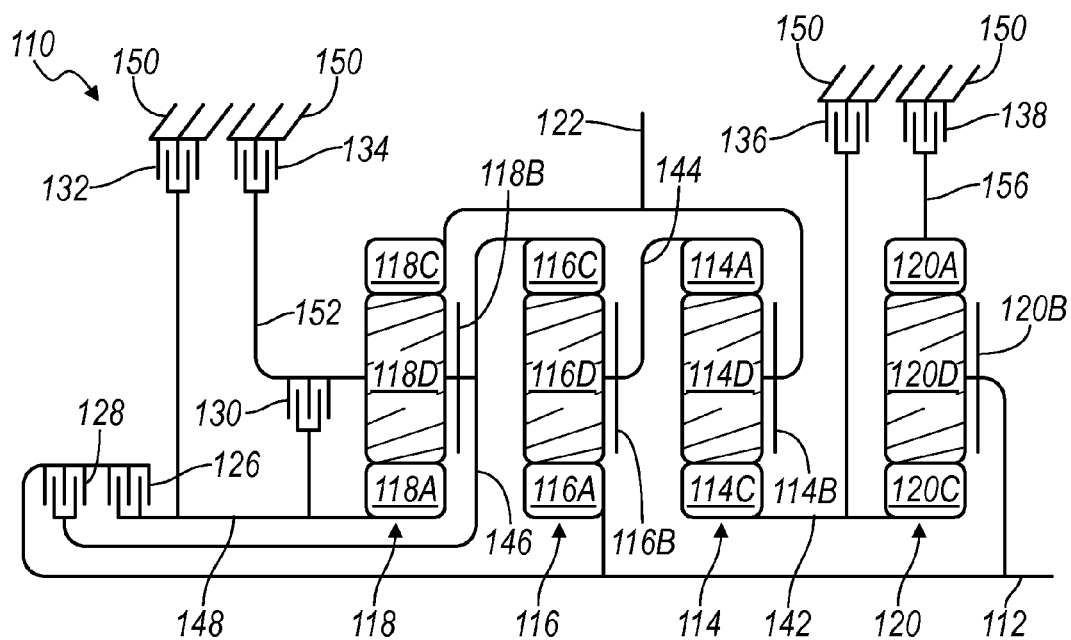
FIG. 2 is a diagrammatic illustration of a variation of the transmission of FIG. 1 according to the principles of the present invention.

Referring now to FIG. 2, a stick diagram presents a schematic layout of an embodiment of the twelve speed transmission 110 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 114 includes a first sun gear member 114C, a first ring gear member 114A, and a first planet gear carrier member 114B that rotatably supports a first set of planet gears 114D (only one of which is shown). The first planetary gear set 114 is a simple planetary gear set in this variation, but in other variations of the present invention, the first planetary gear set 114 could be a compound planetary gear set. The first sun gear member 114C is connected for common rotation with a first shaft or interconnecting member 142. The first ring gear member 114A is connected for common rotation with a second shaft or interconnecting member 144. The first planet carrier member 114B is connected for common rotation with the output shaft or member 122. The first planet gears 114D are each configured to intermesh with both the first sun gear member 114C and the first ring gear member 114A.

The second planetary gear set 116 includes a second sun gear member 116A, a second ring gear member 116C, and a second planet gear carrier member 116B that rotatably supports a second set of planetary gears 116D (only one of each is shown). The second planetary gear set 116 is a simple planetary gear set in this variation, but in other variations of the present invention, the second planetary gear set 116 could be a compound planetary gear set having more than one set of planetary gears supported by the carrier member 116B. The second sun gear member 116A is connected for common rotation with the input shaft or member 112. The second planet carrier member 116B is connected for common rotation with the second shaft or interconnecting member 144. The second ring gear member 116C is connected for common rotation with a third shaft or interconnecting member 146. The second set of planet gears 116D is configured to intermesh with both the second ring gear member 116C and the second sun gear member 116A.

The third planetary gear set 118 includes a third sun gear member 118A, a third ring gear member 118C, and a third planet gear carrier member 118B that rotatably supports a third set of planet gears 118D (only one of which is shown). In other words, the third planetary gear set 118 is a simple planetary gear set in this variation, but in other variations of the present invention, the third planetary gear set 118 could be a compound planetary gear set. The third sun gear member 118A is connected for common rotation with a fourth shaft or interconnecting member 148. The third planet carrier member 118B is connected for common rotation with the third shaft or interconnecting member 146 and a fifth shaft or interconnecting member 152. The third ring gear member 118C is connected for common rotation with the output shaft or member 122. The third planet gears 118D are each configured to intermesh with both the third sun gear member 118A and the third ring gear member 118C.

The fourth planetary gear set 120 includes a fourth sun gear member 120C, a fourth ring gear member 120A, and a fourth planet gear carrier member 120B that rotatably supports a fourth set of planet gears 120D (only one of which is shown). In other words, the fourth planetary gear set 120 is a simple planetary gear set in this variation, but in other variations of the present invention, the fourth planetary gear set 120 could be a compound planetary gear set. The fourth sun gear member 120C is connected for common rotation with the first shaft or interconnecting member 142. The fourth ring gear member 120A is connected for common rotation with a sixth shaft or interconnecting member 156. The fourth planetary gear carrier member 120B is connected for common rotation with the input shaft or member 112. The fourth planet gears 120D are each configured to intermesh with both the fourth sun gear member 120C and the fourth ring gear member 120A.

The input shaft or member 112 is continuously connected to an input source, such as an engine (not shown) or a turbine of a torque converter (not shown). The output shaft or member 122 is continuously connected with another output such as the final drive unit or transfer case (not shown).

The torque-transmitting mechanisms, including the first, second, and third clutches 126, 128, 130 and the first, second, third, and fourth brakes 132, 134, 136, 138 allow for selective interconnection of the shafts or interconnecting members 142, 144, 146, 148, 152, 156 of the planetary gear sets 114A-C, 116A-C, 118A-C, 120A-C, and the housing 150.

For example, the first clutch 126 is selectively engageable to connect the input shaft or member 112 with the fourth shaft or interconnecting member 148. The second clutch 128 is selectively engageable to connect the input shaft or member 112 with the third shaft or interconnecting member 146. The third clutch 130 is selectively engageable to connect the fifth shaft or interconnecting member 152 with the fourth shaft or interconnecting member 148. In another embodiment (not shown), the third clutch 130 is selectively engageable to connect the fifth shaft of interconnecting member 152 with the output member 122. In yet another embodiment (not shown), the third clutch 130 is selectively engageable to connect the output member 122 with the fourth shaft or interconnecting member 148.

The first brake 132 is selectively engageable to connect the fourth shaft or interconnecting member 148 with the stationary element or the transmission housing 150 in order to restrict the member 148 from rotating relative to the transmission housing 150. The second brake 134 is selectively engageable to connect the fifth shaft or interconnecting member 152 with the stationary element or the transmission housing 150 in order to restrict the member 152 from rotating relative to the transmission housing 150. The third brake 136 is selectively engageable to connect the first shaft or interconnecting member 142 with the stationary element or the transmission housing 150 in order to restrict the member 142 from rotating relative to the transmission housing 150. The fourth brake 138 is selectively engageable to connect the sixth shaft or interconnecting member 156 with the stationary element or the transmission housing 150 in order to restrict the member 156 from rotating relative to the transmission housing 150. In turn, the gear elements connected to each of the connecting members are also connected or restricted accordingly.

Figures 3, 4:
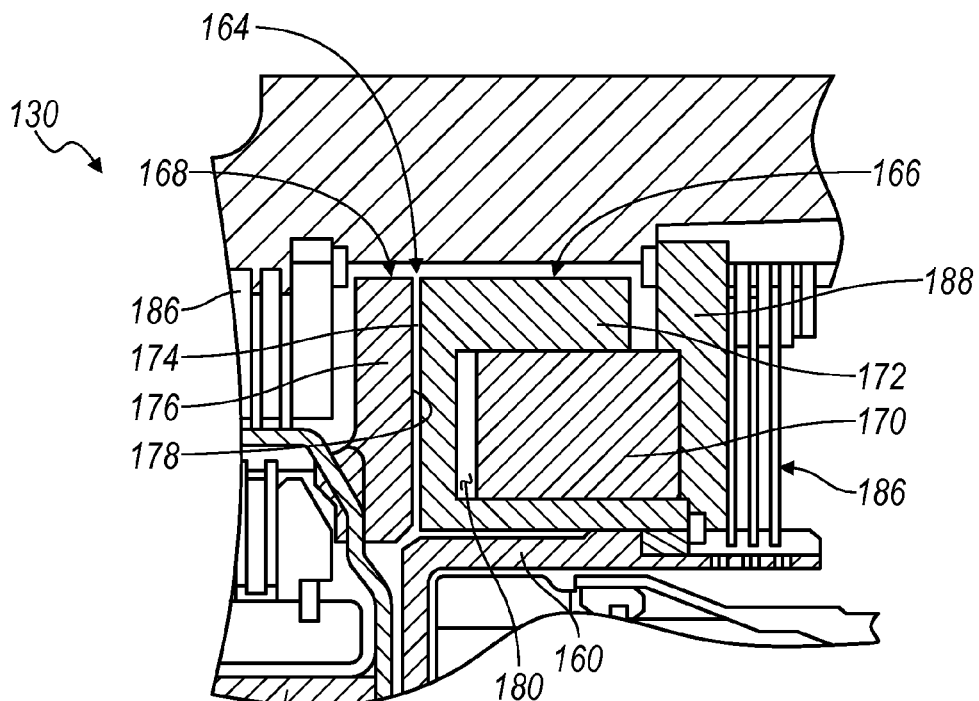
FIG. 3 is a truth table presenting an example of a state of engagement of various torque transmitting elements in forward and reverse speeds or gear ratios of the transmissions illustrated in FIGS. 1-2.
FIG. 4 is a side cross-sectional view of a portion of a transmission including a rotating clutch assembly, in accordance with the principles of the present invention.

Referring now to FIG. 2 and FIG. 3, the operation of the embodiment of the transmission 110 will be described. It will be appreciated that transmission 110 is capable of transmitting torque from the input shaft or member 112 to the output shaft or member 122 in eleven, twelve, or more forward speed torque ratios and at least one reverse speed or torque ratio. Each forward and reverse speed or torque ratio is attained by engagement of one or more of the torque-transmitting mechanisms (i.e. first clutch 126, second clutch 128, third clutch 130, first brake 132, second brake 134, third brake 136, and fourth brake 138), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. An "O" in the box means that a particular clutch or brake is engaged but not carrying torque (no "O's" are present in FIG. 3). Actual numerical gear ratios of the various gear states are also presented although it should be appreciated that these numerical values are exemplary only and that they may be adjusted over significant ranges to accommodate various applications and operational criteria of the transmission 110. Of course, other gear ratios are achievable depending on the gear diameter, gear teeth count and gear configuration selected.

For example to establish a reverse gear, the first clutch 126 and the second brake 134 are engaged or activated. The first clutch 126 connects the input shaft or member 112 with the fourth shaft or interconnecting member 148. The second brake 134 connects the fifth shaft or interconnecting member 152 with the stationary element or the transmission housing 150 in order to restrict the member 152 from rotating relative to the transmission housing 150, which restricts the third planetary carrier member 118B and the second ring gear member 116C from rotating relative to the transmission housing 150. Likewise, twelve forward ratios are achieved through different combinations of clutch and brake engagement, as shown in FIG. 3, by way of example.

It will be appreciated that the foregoing explanation of operation and gear states of the transmissions 110 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIG. 4, the third clutch assembly 130 will be described in more detail. FIG. 4 shows the third clutch assembly 130 in a portion of a transmission, which may be one of the transmissions 110 hereinbefore described, or it may be an entirely different transmission. If used with one of the transmissions 110 shown above, the third clutch assembly 130 may be disposed in the power flow of FIG. 1 or 2, as explained above, but the third clutch assembly 130 may alternatively be used as one of the first and second clutches 126, 128, or as a clutch in another transmission, without falling beyond the spirit and scope of the present disclosure.

The third clutch assembly 130 (hereinafter, clutch assembly 130) is operable to selectively connect two members together. In FIG. 4, the clutch assembly 130 is configured to selectively interconnect a first transmission member 160 with a second transmission member 162. In the third clutch 130 of FIGS. 1-2, the clutch assembly 130 selectively couples the second member 118B of the third planetary gear set 118 and the third member 116C of the second planetary gear set 116 (which are coupled to one of the first and second members 160, 162) with the first member 118A of the third planetary gear set 118A (which is coupled to the other of the first and second members 160, 162). In the alternative, the third clutch 130 could selectively connect the third node 118C of the third planetary gear set 118 with the second node 118B of the third planetary gear set 118. In another alternative, the third clutch 130 could selectively connect the third node 118C of the third planetary gear set 118 with the first node 118A of the third planetary gear set 118.

The first transmission member 160 is configured to rotate during at least one output gear speed of one of the automatic transmissions 110 (or another transmission). The second transmission member 162 is also configured to rotate during at least one output gear speed of one of the automatic transmissions 110 (or another transmission). Thus, the clutch assembly 130 is a rotating clutch assembly, wherein both of the members 160, 162 that the clutch assembly 130 selectively interconnects may be rotating immediately before and when the clutch assembly 130 is engaged. In the alternative, one or both of the first and second members 160, 162 may be stopped (not rotating) immediately before and when the clutch assembly 130 is engaged.

The clutch assembly 130 includes an electromechanical assembly 164 selectively engageable to interconnect the first transmission member 160 with the second transmission member 162. The electromechanical assembly 164 has a rotor assembly 166 coupled to the first transmission member 160, an armature assembly 168 coupled to the second transmission member 162, and an electromagnetic coil 170. The electromagnetic coil 170 is operable to selectively engage the rotor assembly 166 with the armature assembly 168. The electromagnetic coil 170 may be, for example, a field coil that creates a magnetic flux when energized. The electromagnetic coil 170 may be generally annular in shape, and only a cross-section is illustrated in FIG. 4.

The rotor assembly 166 includes a rotor 172 having a rotor surface 174. The armature assembly 168 includes an armature 176 having an armature surface 178. The armature 176 and the rotor 172 may be generally annular in shape, and only a cross-section is illustrated in FIG. 4. In this variation, the armature surface 178 is a planar surface that is perpendicular to a central input shaft of the transmission (not shown), wherein the central input shaft is understood to run in a flat, horizontal direction in the orientation of FIG. 4. The rotor surface 174 is also a planar surface that is perpendicular to the central input shaft of the transmission. The rotor 172 has portions forming a cavity 180 in the rotor 172. The electromagnetic coil 170 is at least partially disposed in the cavity 180 of the rotor 172, in this embodiment.

When energized, the electromagnetic coil 170 is operable to selectively interconnect the armature surface 178 with the rotor surface 174. The electromagnetic coil 170 may cause one of both of the rotor 172 and the armature 176 to move, in order to bring them together. In this embodiment, the electromagnetic coil 170 creates a magnetic flux that attracts the armature 168 toward and into contact with the rotor 172. The armature 176 may be comprised of a permanent magnetic material that is attracted to the rotor 172 when the electromagnetic coil 170 is energized. The rotor 172 may be magnetic when the electromagnetic coil 170 is energized. In this embodiment, the rotor 172 may be rotating or spinning about an axis, but it refrains from moving in a linear direction.

When interconnected, the armature surface 178 and the rotor surface 174 contact one another. In the illustrated embodiment, the rotor surface 174 is the sole portion of the rotor assembly 166 in contact with the armature assembly 168 when the rotating clutch assembly 130 is engaged. When the electromagnetic coil 170 is energized, a friction force is generated at the contact of the rotor surface 174 and the armature surface 178. As such, the armature 176 and the rotor 172 rotate together when the electromagnetic coil 170 is energized, which also causes the first and second members 160, 162 to rotate together, because they are connected to the rotor assembly 166 and the armature assembly 168, respectively.

When the electromagnetic coil 170 is deenergized, the armature assembly 168 returns to its non-engaged position. In other words, the armature 176 moves out of contact with the rotor assembly 166 when the electromagnetic coil 170 is deenergized. A spring member could be employed, in some embodiments, to bias the armature 176 away from the rotor assembly 166. The spring member supports the armature 176. When the electromagnetic coil 170 is energized, the magnetic attraction between the rotor 172 and the armature 176 overcomes the spring force, and the armature 176 moves into contact with the rotor 172. When the electromagnetic coil 170 is deenergized, however, the spring member biases the armature 176 away from the rotor 172. Accordingly, when the electromagnetic coil 170 is deenergized, the first and second members 160, 162 are decoupled and they are free to rotate independently of one another.

The rotating clutch assembly 130 occupies little space within the transmission case 150. It does not use a typical multiple plate clutch pack, having, for example, four or more interleaved clutch plates. FIG. 4 shows clutch plates 186 surrounding the clutch assembly 130, but those clutch plates 186, as well as backing plate 188, belong to some of the other torque transmitting mechanisms 126, 128, 132, 134, 136, 138 within the transmission 110. The rotating clutch assembly 130 may experience zero or a negligible amount of spin loss. Therefore, fuel economy is improved.

The description of the invention is merely exemplary in nature and variations that do not depart from the gist of the invention are intended to be within the scope of the invention. Such variations are not to be regarded as a departure from the spirit and scope of the invention.

What is claimed is:

1. An automotive transmission comprising:
   an input member;
   an output member;
   a plurality of planetary gear sets, each planetary gear set of the plurality of planetary gear sets having a plurality of rotatable members;
   a plurality of torque transmitting mechanisms each selectively engageable to interconnect at least one of the rotatable members of the plurality of rotatable members with one of a stationary member and at least one other of the rotatable members of the plurality of rotatable members, at least one of the torque transmitting mechanisms of the plurality of torque transmitting mechanisms being an electromechanical rotating clutch assembly comprising:
   a rotor coupled to one of a first rotatable member of the plurality of rotatable members and a stationary member;
   an armature coupled to one of a stationary member and another rotatable member of the plurality of rotatable members; and
   an electromagnetic coil, the electromagnetic coil being operable to selectively engage the rotor with the armature,
   wherein the plurality of torque transmitting mechanisms are selectively enqaqeable to establish a plurality of forward speed ratios and at least one reverse speed ratio between the input member and the output member.

2. The automotive transmission of claim 1, wherein the rotor has a rotor surface, wherein the armature has an armature surface, and wherein the electromagnetic coil is operable to selectively interconnect the armature surface with the rotor surface, the armature surface and the rotor surface being in contact with each other when interconnected.

3. The automotive transmission of claim 2, wherein the rotor surface is the sole portion of the rotor in contact with the armature when the electromechanical rotating clutch assembly is engaged.

4. The automotive transmission of claim 3, wherein the electromagnetic coil is operable to attract the armature toward and into contact with the rotor.

5. The automotive transmission of claim 4, wherein the rotor has portions forming a cavity in the rotor, the electromagnetic coil being at least partially disposed in the cavity of the rotor.

6. The automotive transmission of claim 5, wherein the armature comprises permanent magnet material, the rotor being magnetic when energized by the electromagnetic coil.

7. The automotive transmission of claim 6, wherein the armature surface is a planar surface perpendicular to the input shaft of the automotive transmission, and wherein the rotor surface is a planar surface perpendicular to the input shaft of the automotive transmission.

8. The automotive transmission of claim 7, further comprising a spring member supporting the armature, the spring member configured to bias the armature away from the rotor.

9. A transmission comprising:
   an input member;
   an output member;
   first, second, third, and fourth planetary gear sets each having first, second, and third members;
   a first interconnecting member continuously interconnecting the third member of the first planetary gear set with the third member of the fourth planetary gear set;
   a second interconnecting member continuously interconnecting the second member of the first planetary gear set with the third member of the third planetary gear set;
   a third interconnecting member continuously interconnecting the first member of the first planetary gear set with the second member of the second planetary gear set;
   a fourth interconnecting member continuously interconnecting the third member of the second planetary gear set with the second member of the third planetary gear set;
   a fifth interconnecting member continuously interconnecting the first member of the second planetary gear set with the second member of the fourth planetary gear set; and
   seven torque transmitting mechanisms each selectively engageable to interconnect at least one of the first, second, and third members with at least one other of the first, second, third members and a stationary member,
   wherein the seven torque transmitting mechanisms are selectively engageable in combinations of at least two to establish a plurality of forward speed ratios and at least one reverse speed ratio between the input member and the output member, a first torque transmitting mechanism of the seven torque transmitting mechanisms comprising a rotor, an armature, and an electromagnetic coil, the electromagnetic coil being operable to selectively engage the rotor with the armature.

10. The transmission of claim 9, wherein the second member of the third planetary gear set and the third member of the second planetary gear set are continuously connected for common rotation with one of the armature and the rotor, the first member of the third planetary gear set being continuously connected for common rotation with the other of the armature and the rotor.

11. The transmission of claim 10, wherein the rotor has a rotor surface, wherein the armature has an armature surface, and wherein the electromagnetic coil is operable to selectively interconnect the armature surface with the rotor surface, the armature surface and the rotor surface being in contact with each other when interconnected.

12. The transmission of claim 11, wherein the first torque transmitting mechanism is selectively engageable to interconnect the first member of the third planetary gear set with the second member of the third planetary gear set and the third member of the second planetary gear set; wherein a second of the seven torque transmitting mechanisms is selectively engageable to interconnect the third member of the second planetary gear set and the second member of the third planetary gear set with the input member, the second member of the fourth planetary gear set, and the first member of the second planetary gear set; wherein a third of the seven torque transmitting mechanisms is selectively engageable to interconnect the first member of the third planetary gear set with the stationary member; wherein a fourth of the seven torque transmitting mechanisms is selectively engageable to interconnect the second member of the third planetary gear set and the third member of the second planetary gear set with the stationary member; wherein a fifth of the seven torque transmitting mechanisms is selectively engageable to interconnect the third member of the first planetary gear set and the third member of the fourth planetary gear set with the stationary member; wherein a sixth of the seven torque transmitting mechanisms is selectively engageable to interconnect the first member of the fourth planetary gear set with the stationary member; wherein a seventh of the seven torque transmitting mechanisms is selectively engageable to interconnect the first member of the third planetary gear set with the input member, the second member of the fourth planetary gear set, and the first member of the second planetary gear set; and wherein the output member is continuously connected for common rotation with the second member of the first planetary gear set and the third member of the third planetary gear set.

13. The transmission of claim 12, wherein the third member of the first planetary gear set, the third member of the fourth planetary gear set, the first member of the second planetary gear set, and the first member of the third planetary gear set are sun gear members; wherein the second members of the first, second, third, and fourth planetary gear sets are planetary gear carrier members; and wherein the first member of the first planetary gear set, the first member of the fourth planetary gear set, the third member of the second planetary gear set, and the third member of the third planetary gear set are ring gear members.

14. The transmission of claim 13, wherein the rotor surface is the sole portion of the rotor in contact with the armature when the first torque transmitting mechanism is engaged.

15. The transmission of claim 14, wherein the electromagnetic coil is operable to attract the armature toward and into contact with the rotor.

16. The transmission of claim 15, wherein the rotor has portions forming a cavity in the rotor, the electromagnetic coil being at least partially disposed in the cavity of the rotor.

17. The transmission of claim 16, wherein the armature comprises permanent magnet material, the rotor being magnetic when energized by the electromagnetic coil.

18. The transmission of claim 17, wherein the armature surface is a planar surface perpendicular to the input member, and wherein the rotor surface is a planar surface perpendicular to the input member.

19. The transmission of claim 18, further comprising a spring member supporting the armature, the spring member configured to bias the armature away from the rotor.

20. A transmission comprising:
a stationary member;
a first planetary gear set having a first sun gear member, a first planetary gear carrier member, and a first ring gear member;
a second planetary gear set having a second sun gear member, a second planetary gear carrier member, and a second ring gear member;
a third planetary gear set having a third sun gear member, a third planetary gear carrier member, and a third ring gear member;
a fourth planetary gear set having a fourth sun gear member, a fourth planetary gear carrier member, and a fourth ring gear member;
an input member continuously connected for common rotation with the second sun gear member and the fourth planetary gear carrier member;
an output member continuously connected for common rotation with the first planetary gear carrier member and the third ring gear member;
a first interconnecting member continuously interconnecting the first sun gear member with the fourth sun gear member;
a second interconnecting member continuously interconnecting the first ring gear member with the second planetary gear carrier member;
a third interconnecting member continuously interconnecting the second ring gear member with the third planetary gear carrier member;
a first clutch selectively engageable to interconnect the third sun gear member with the input member, the second sun gear member, and the fourth planetary gear carrier member;
a second clutch selectively engageable to interconnect the third planetary gear carrier member and the second ring gear member with the input member, the second sun gear member, and the fourth planetary gear carrier member;
a third clutch selectively engageable to interconnect the third planetary gear carrier member and the second ring gear member with the third sun gear member, the third clutch comprising a rotor, an armature, and an electromagnetic coil operable to selectively engage the rotor with the armature, wherein the rotor has a rotor surface, wherein the armature has an armature surface, and wherein the electromagnetic coil is operable to selectively interconnect the armature surface with the rotor surface, the armature surface and the rotor surface being in contact with each other when interconnected;
a first brake selectively engageable to interconnect the third sun gear member with the stationary member;
a second brake selectively engageable to interconnect the third planetary gear carrier member and the second ring gear member with the stationary member;
a third brake selectively engageable to interconnect the first sun gear member and the fourth sun gear member with the stationary member; and
a fourth brake selectively engageable to interconnect the fourth ring gear member with the stationary member,
wherein the first, second, and third clutches and the first, second, third, and fourth brakes are selectively engageable in combinations of at least two to establish at least twelve forward speed ratios and at least one reverse speed ratio between the input member and the output member.

* * * * *